US007986794B2

(12) United States Patent
Zhang

(10) Patent No.: US 7,986,794 B2
(45) Date of Patent: Jul. 26, 2011

(54) SMALL ARRAY MICROPHONE APPARATUS AND BEAM FORMING METHOD THEREOF

(75) Inventor: Ming Zhang, Cupertino, CA (US)

(73) Assignee: Fortemedia, Inc., Cupertino, CA (US)

( * ) Notice: Subject to any disclaimer, the term of this patent is extended or adjusted under 35 U.S.C. 154(b) by 1232 days.

(21) Appl. No.: 11/622,058

(22) Filed: Jan. 11, 2007

(65) Prior Publication Data

US 2008/0170716 A1 Jul. 17, 2008

(51) Int. Cl.
*H04R 3/00* (2006.01)
*H04B 15/00* (2006.01)

(52) U.S. Cl. ......................... 381/92; 381/94.1; 381/71.7

(58) Field of Classification Search ................. 381/71.6, 381/71.7, 91, 94.1, 313; 367/118
See application file for complete search history.

(56) References Cited

U.S. PATENT DOCUMENTS

| | | | | |
|---|---|---|---|---|
| 4,559,642 | A * | 12/1985 | Miyaji et al. | 381/92 |
| 5,226,087 | A * | 7/1993 | Ono et al. | 381/92 |
| 7,120,262 | B2 * | 10/2006 | Klinke | 381/92 |
| 2008/0152154 | A1 * | 6/2008 | Daishin et al. | 381/26 |

* cited by examiner

*Primary Examiner* — Davetta Goins
*Assistant Examiner* — Phylesha Dabney
(74) *Attorney, Agent, or Firm* — Thomas|Kayden

(57) ABSTRACT

The invention provides a beam forming method for a small array microphone apparatus to generate cone beam pattern by processing a combined bi-directional beam pattern of two virtual bi-directional microphones formed through at least three omni-directional microphones arranged in an L-shape. The invention also provides a small array microphone apparatus using the beam forming method according to the invention to suppress noise by processing a combined bi-directional beam pattern of two virtual bi-directional microphones formed through at least three omni-directional microphones arranged in an L-shape, thereby outputting a clear audio signal with cone beam pattern.

32 Claims, 14 Drawing Sheets

SMALL ARRAY MICROPHONE APPARATUS AND BEAM FORMING METHOD THEREOF

BACKGROUND OF THE INVENTION

1. Field of the Invention

The invention relates to a microphone apparatus, and in particular to a small array microphone apparatus and beam forming method thereof.

2. Description of the Related Art

In FIG. 1, two omni-directional microphones 10 and 12 are put approximately on a line (X coordinate) and a near-end talker 14 vertically faces to the line formed by the two omni-directional microphones 10 and 12.

The bi-directional microphone outputs signals with a bi-directional pattern 16 as depicted in FIG. 1. The bi-directional pattern 16 has two lobes 16*a* and 16*b* pointing left and right on line X. Because beam forming using the bi-directional pattern 16 for noise suppression can only form a so-called "pie" beam, the bi-directional pattern 16 is appropriate for suppressing noise from left and right directions, but not for noise from up and down directions. Therefore, bi-directional pattern 16 is not adequate for many applications such as cell phones, smart phones and other portable communication devices, etc. due to their inability to suppress noise from the bottom of such communications devices.

BRIEF SUMMARY OF INVENTION

An object of the invention is to provide a beam forming method for a small array microphone apparatus to generate a cone beam pattern by processing a combined bi-directional beam pattern of two bi-directional microphones formed through at least three omni-directional microphones arranged in an L-shape or a triangular shape.

Another object of the invention is to provide a small array microphone apparatus using the beam forming method of the invention to suppress noise by processing a combined bi-directional beam pattern of two bi-directional microphones formed through at least three omni-directional microphones arranged in an L-shape or a triangular shape, thereby outputting a clear audio signal with cone beam pattern.

To achieve the described object, the invention provides a beam forming method for a small array microphone apparatus, comprising the following steps. At least a first, second and third omni-directional microphones are arranged on a common plane but not on a common line to convert received sound into first, second and third electrical signals. A first bi-directional microphone, which outputs a first directional microphone signal with a first bi-directional pattern, comprising first and second omni-directional microphones is then formed. A second bi-directional microphone outputting a second directional microphone signal with a second bi-directional pattern and comprising second and third omni-directional microphones is then formed. Finally, the first and second directional microphone signals are combined for generating a combined directional microphone signal with a combined beam pattern correlated to the first and second bi-directional patterns for noise suppression. Note that the first to third omni-directional microphones are arranged in an L-shape or a triangular shape.

To achieve the described object, the invention provides another beam forming method for small array microphone apparatus comprising the following steps. At least a first, second, third and fourth omni-directional microphones are arranged on a common plane but not on a common line to convert received sound into a first, second, third and fourth electrical signals. Second, make the first and third omni-directional microphones form a first bi-directional microphone which outputs a first directional microphone signal with a first bi-directional pattern. Third, make the second and fourth omni-directional microphones form a second bi-directional microphone which outputs a second directional microphone signal with a second bi-directional pattern. Finally, the first and second directional microphone signals are combined for generating a combined directional microphone signal with a combined beam pattern correlated to the first and second bi-directional patterns for noise suppression. Note that the first to fourth omni-directional microphones are arranged in quadrilateral shape or square shape.

To achieve the object, the invention provides a small array microphone apparatus comprising: at least a first, second and third omni-directional microphones, arranged on a common plane but not in a line, respectively converting received sound into a first, second and third electrical signals; a directional microphone forming device receiving the first to third electrical signals, to make the first and second omni-directional microphones form a first bi-directional microphone which outputs a first directional microphone signal with a first bi-directional pattern and make the second and third omni-directional microphones form a second bi-directional microphone which outputs a second directional microphone signal with a second bi-directional pattern; a combining device receiving the first and second directional microphone signals and outputting a combined directional microphone signal with a combined beam pattern correlated to the first and second bi-directional patterns for noise suppression.

To achieve the described object, the invention provides another small array microphone apparatus comprises: at least a first, second, third and fourth omni-directional microphones, arranged on a common plane but not in a line, respectively converting received sound into a first, second third and fourth electrical signals; a directional microphone forming device receiving the first to fourth electrical signals, to make the first and third omni-directional microphones form a first bi-directional microphone which outputs a first directional microphone signal with a first bi-directional pattern and make the second and fourth omni-directional microphones form a second bi-directional microphone which outputs a second directional microphone signal with a second bi-directional pattern; and a combining device receiving the first and second directional microphone signals and outputting a combined directional microphone signal with a combined beam pattern correlated to the first and second bi-directional patterns for noise suppression.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
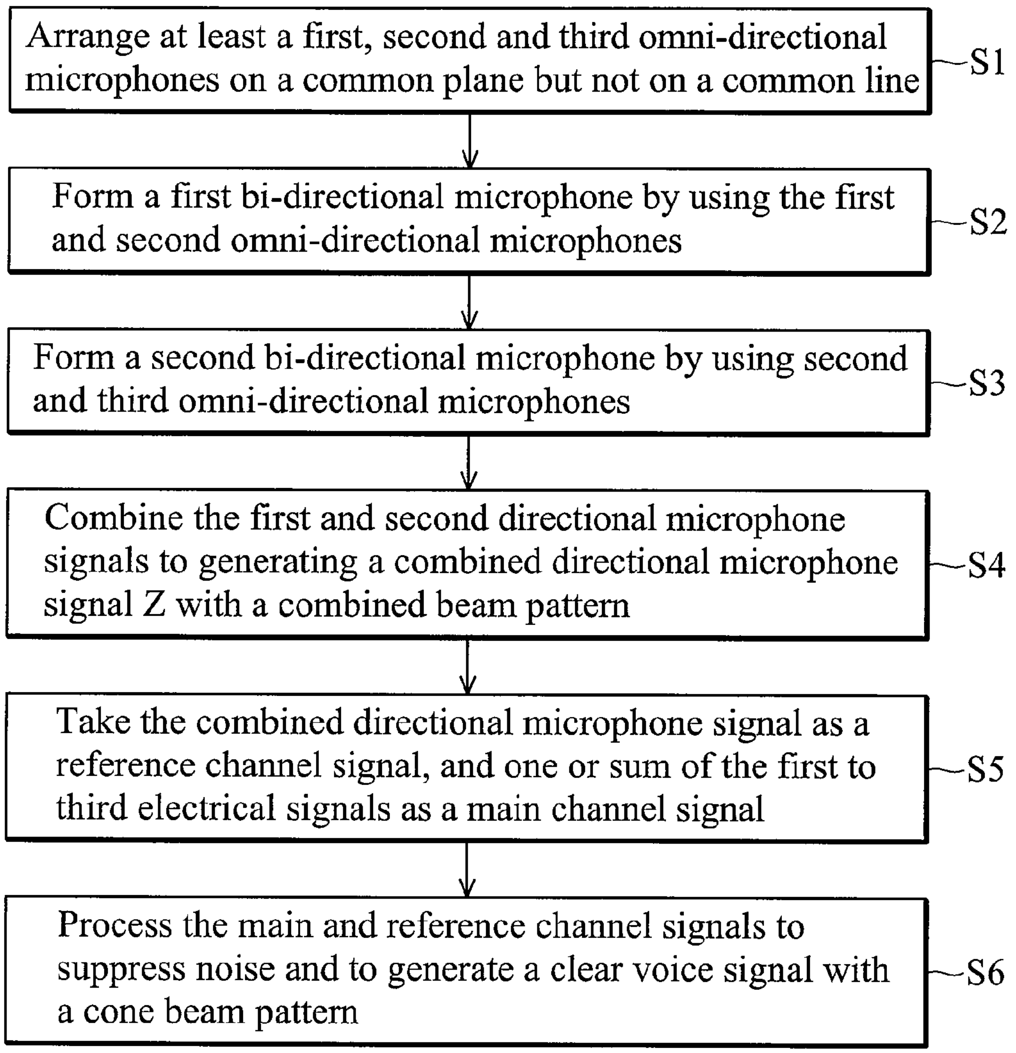
FIG. 2 is a flow chart showing a beam forming method of small array microphone apparatus according to an embodiment of the invention.
Figure 3B:
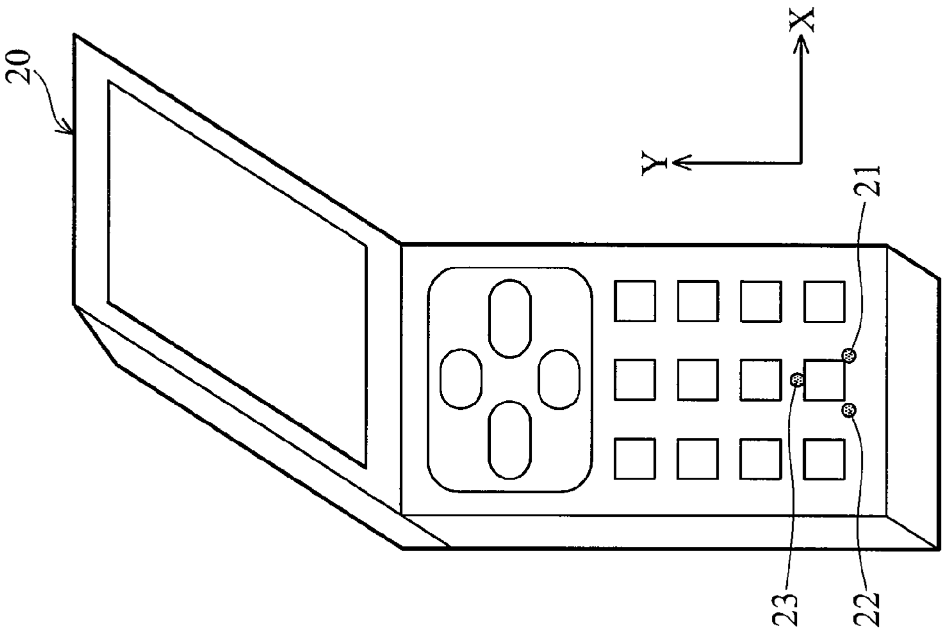
FIGS. 3A and 3B show arrangements of three omni-directional microphones of small array microphone apparatuses installed in cell phones.
Figure 3A:
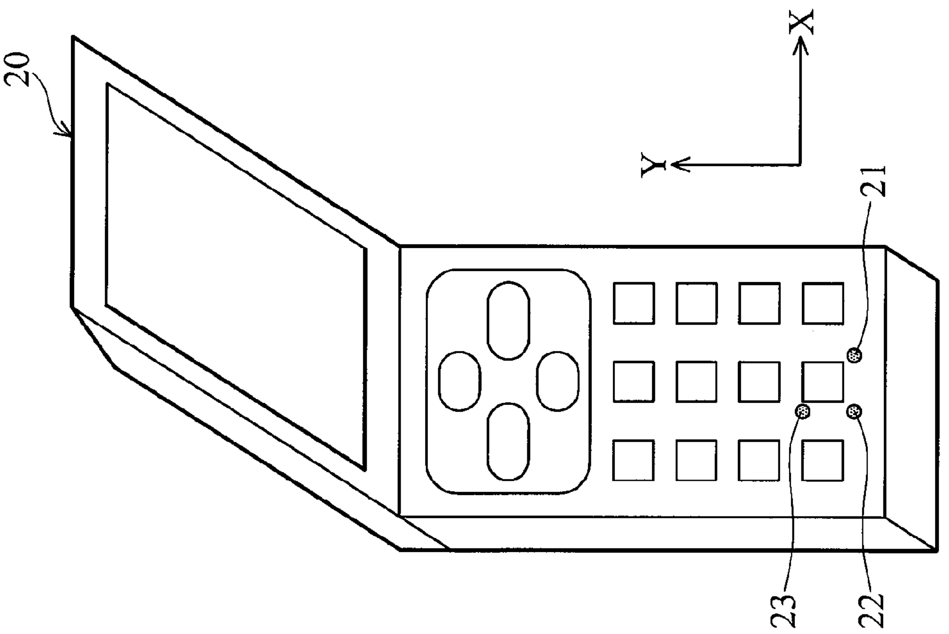
Figure 4:
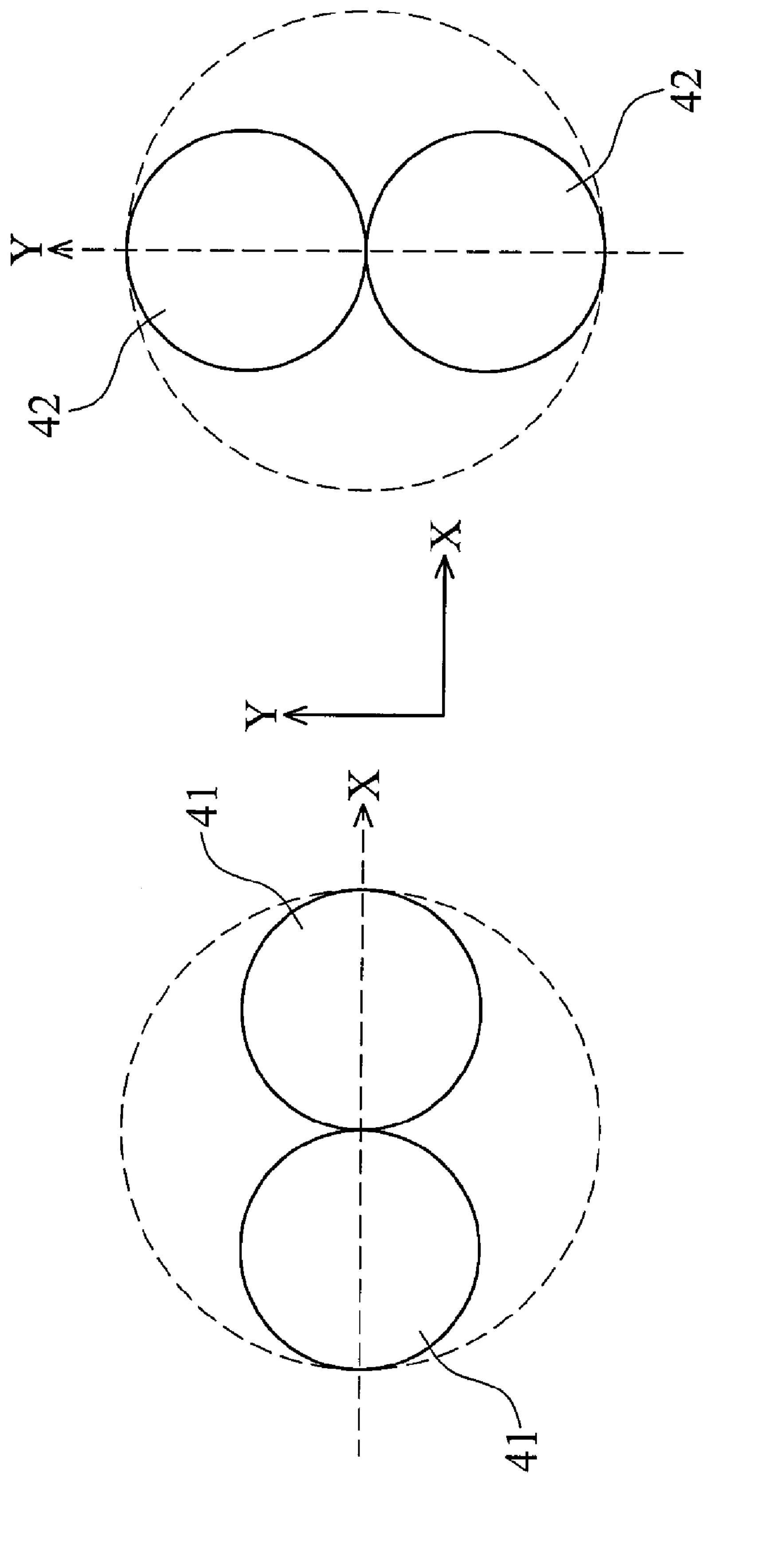
FIG. 4 shows two bi-directional patterns of two directional microphones formed from two omni-directional microphones.

FIG. 2 is a flow chart showing a beam forming method of a small array microphone apparatus according to an embodiment of the invention. First, (in step S1) at least a first, second and third omni-directional microphones 21, 22 and 23 are arranged on a common plane but not on a common line to convert received sound into a first, second and third electrical signals. In this embodiment, the first to third omni-directional microphones 21 to 23 are arranged on a surface of a cell phone 20 in an L-shape as depicted in FIG. 3A. The L-shape arrangement can be extended to any other similar shape, such as the triangular shape shown in FIG. 3B. In step S2, the first and second omni-directional microphones 21 and 22 are used to jointly output a first directional microphone signal d1 with a first bi-directional pattern 41 as depicted in FIG. 4. Also, the first and second omni-directional microphones 21 and 22 can be deemed to form a virtual first bi-directional microphone which outputs a first directional microphone signal d1 with a first bi-directional pattern 41 as depicted in FIG. 4. Next, in step S3, the second and third omni-directional microphones 22 and 23 are used to jointly output a second directional microphone signal d2 with a second bi-directional pattern 42 as depicted in FIG. 4. Also, the second and third omni-directional microphones 22 and 23 can be deemed to form a virtual second bi-directional microphone which outputs a second directional microphone signal d2 with a second bi-directional pattern 42 as depicted in FIG. 4. Note that steps S2 and S3 can be exchanged or carried out simultaneously. Then, (In step S4) the first and second directional microphone signals d1 and d2 are combined to generate a combined directional microphone signal Z with a combined beam pattern correlated to the first and second bi-directional patterns 41 and 42 for noise suppression. In this embodiment, the combined directional microphone signal Z is generated by linearly combining the first and second directional microphone signals d1 and d2 which are digitized signals (d1($n$), d2($n$)), using a first and second weight values $\alpha$ and $\beta$, i.e., $Z=\alpha\times d1+\beta\times d2$. Finally, (in step S5) the combined directional microphone signal Z are taken as a reference channel signal, and one or the sum of the first to third electrical signals are taken as a main channel signal; and (in step S6) the main and reference channel signals are processed to suppress noise and to generate a clear voice signal with a cone beam pattern.

Figure 1:
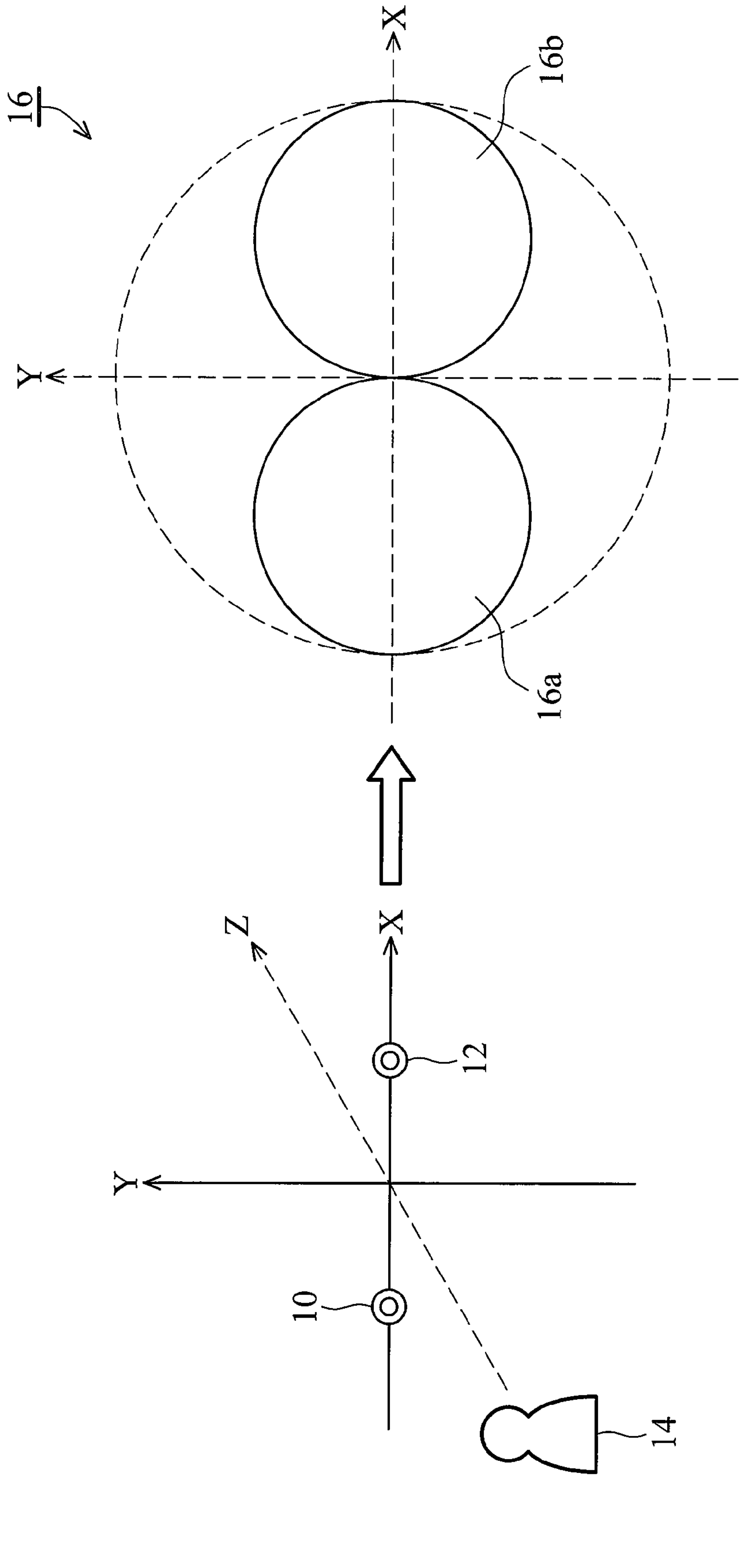
FIG. 1 ( RELATED ART )
FIG. 1 shows a small array microphone apparatus of two omni-directional microphones, and its beam pattern.
Figure 5:
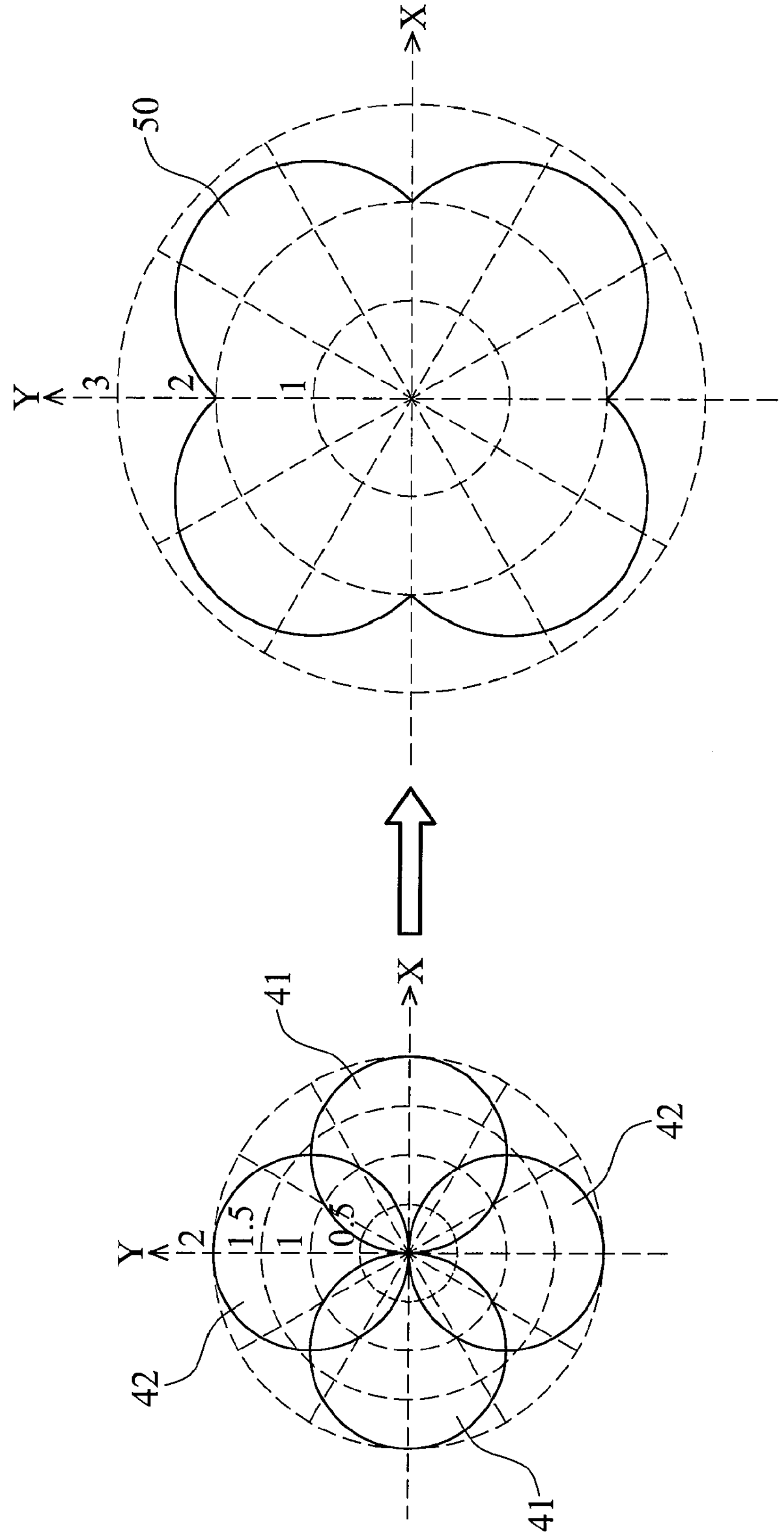
FIG. 5 shows a combined (entire) beam pattern of the two bi-directional patterns in FIG. 4.

In FIG. 4, the first bi-directional pattern 41 has two lobes pointing to the left and right directions of the line (coordinate) X, and the second bi-directional pattern 42 has two lobes pointing to the up and down directions on the line (coordinate) Y. FIG. 5 shows the combined (entire) beam pattern 50 of the first and second bi-directional patterns 41 and 42 corresponding to the combined directional microphone signal Z. Comparing the combined beam pattern 50 and the pattern 16 of FIG. 1, the up and down directions of the beam pattern 50 are enhanced. Consequently, the combined directional microphone signal Z with the combined beam pattern 50 can used as the reference channel signal to cancel noise or sound from the up or down directions.

Figure 6A:
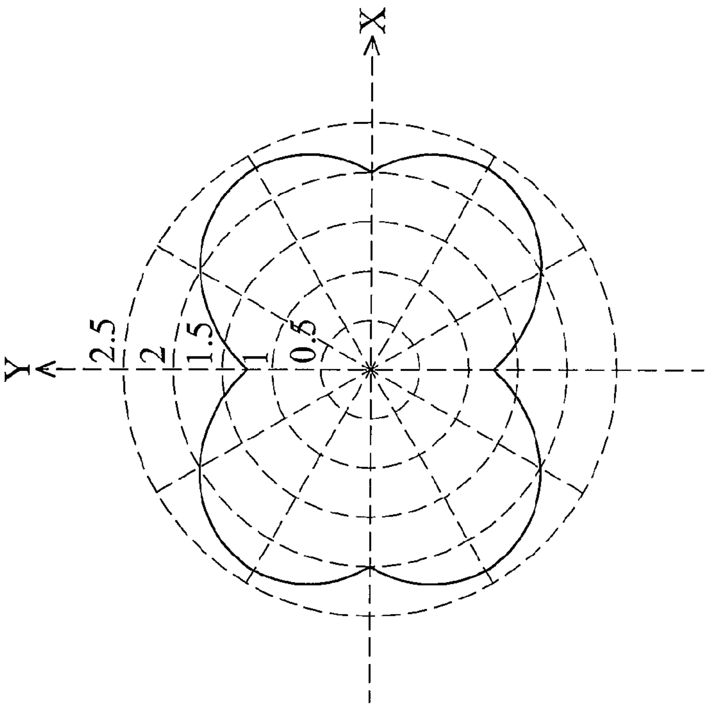
FIGS. 6A and 6B shows another combined beam pattern of the two bi-directional patterns in FIG. 4 with a first weighting value set.
Figure 6B:
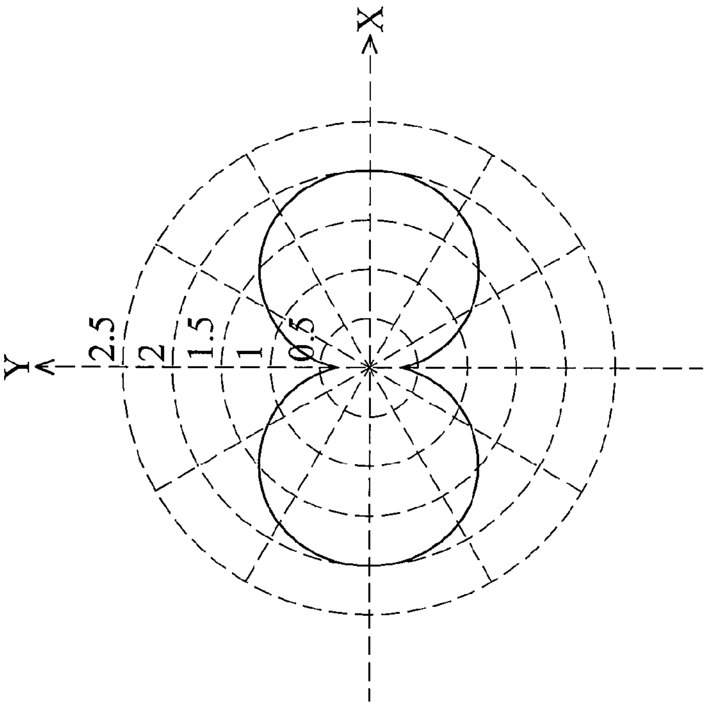

The proportion of $\alpha$ to $\beta$ for combining the first and second directional microphone signals d1 and d2 can be used to adjust the amount of cancellation for the left and right directions as well as the up and down directions. In FIG. 5, the proportion of the combination is 1, i.e., $\alpha$ and $\beta$ equal 1, $Z=d1+d2$. Some applications, however, require more flexibility rather than a narrow beam to obtain a clear audio signal. The proportion of $\alpha$ to $\beta$ can be adjusted to achieve this purpose. FIGS. 6A and 6B show examples of the combined beam patterns corresponding to the combined directional microphone signals Z1($=d1+0.6\times d2$) and Z2($=d1+0.2\times d2$).

Figure 7B:
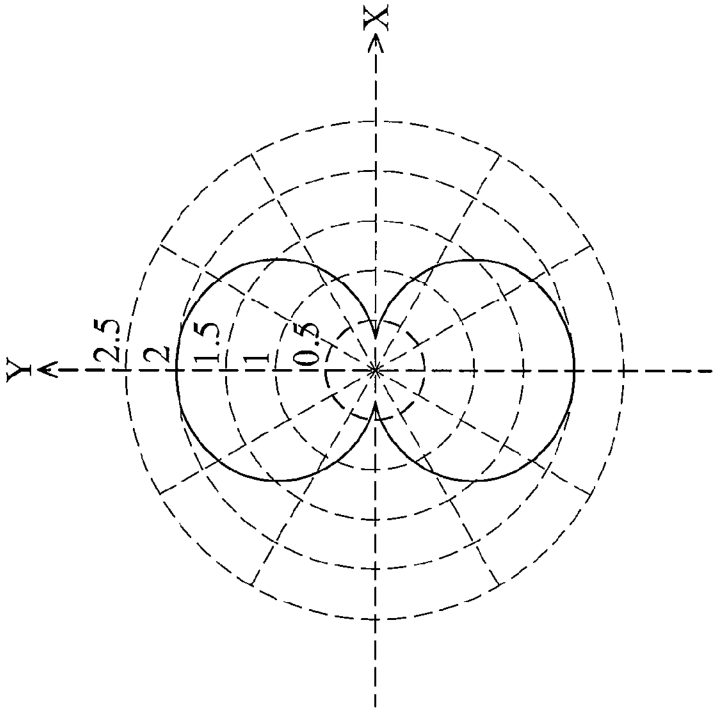
FIGS. 7A and 7B shows another combined beam pattern of the two bi-directional patterns in FIG. 4 with a second weighting value set.
Figure 7A:
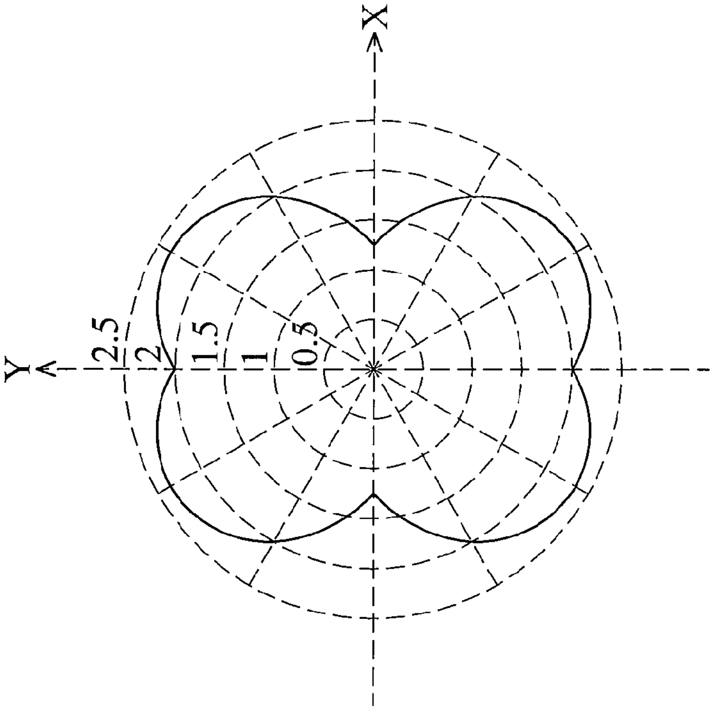

Also, the proportion of $\alpha$ to $\beta$ for combining the first and second directional microphone signals d1 and d2 can be used to adjust the amount of cancellation for the left and right directions. For examples, FIGS. 7A and 7B show the combined beam patterns corresponding to the combined directional microphone signals Z3($=0.6\times d1+d2$) and Z4($=0.2\times d1+d2$).

Figure 8:
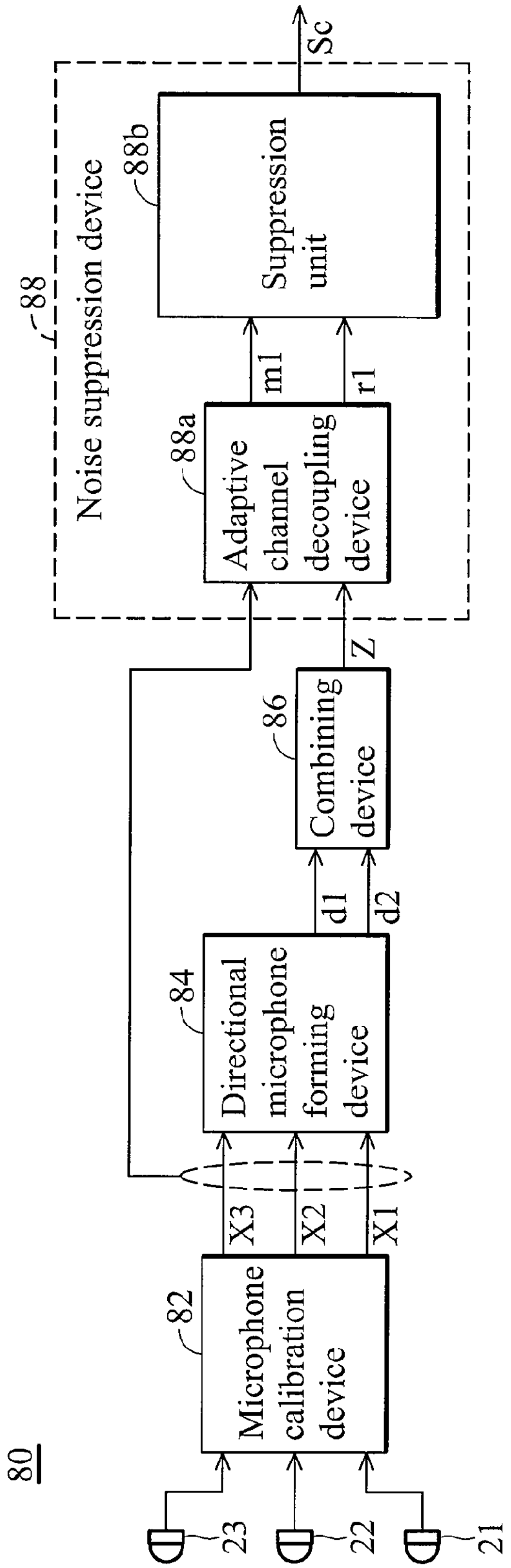
FIG. 8 shows a small array microphone apparatus according to an embodiment of the invention.

FIG. 8 shows a small array microphone apparatus 80 using the beam forming method described above. The small array microphone apparatus 80 comprises a first, second and third omni-directional microphones (21, 22 and 23), a microphone calibration device 82, a directional microphone forming device 84, a combining device and a noise suppression device 88. In this embodiment, the small array microphone apparatus 80 is assumed to be installed in the cell phone 20 as depicted in FIG. 3A or 31B.

The first, second and third omni-directional microphones 21, 22 and 23 are arranged on a common plane but not in a common line, for receiving sound. Here, the first to third omni-directional microphones 21, 22 and 23 are arranged in an L-shape as shown in FIG. 3A or in a triangular shape as shown in FIG. 3B.

The first, second and third omni-directional microphones 21, 22 and 23 receive sound and send received sound to the microphone calibration device 82 to carry out calibration on gains and phases. Therefore, the first, second and third omni-directional microphones (21, 22 and 23) receive and convert the received sound to a first, second and third electrical signals X1, X2 and X3 in conjunction with the microphone calibration device 82.

The directional microphone forming device 84 receives the first to third electrical signals X1, X2 and X3, to the first and second omni-directional microphones 21 and 22 form a first bi-directional microphone which outputs a first directional microphone signal d1 with a first bi-directional pattern 41 (as shown in FIG. 4) and the second and third omni-directional microphones 22 and 23 form a second bi-directional microphone which outputs a second directional microphone signal d2 with a second bi-directional pattern 42 (as shown in FIG. 4).

Figure 9:
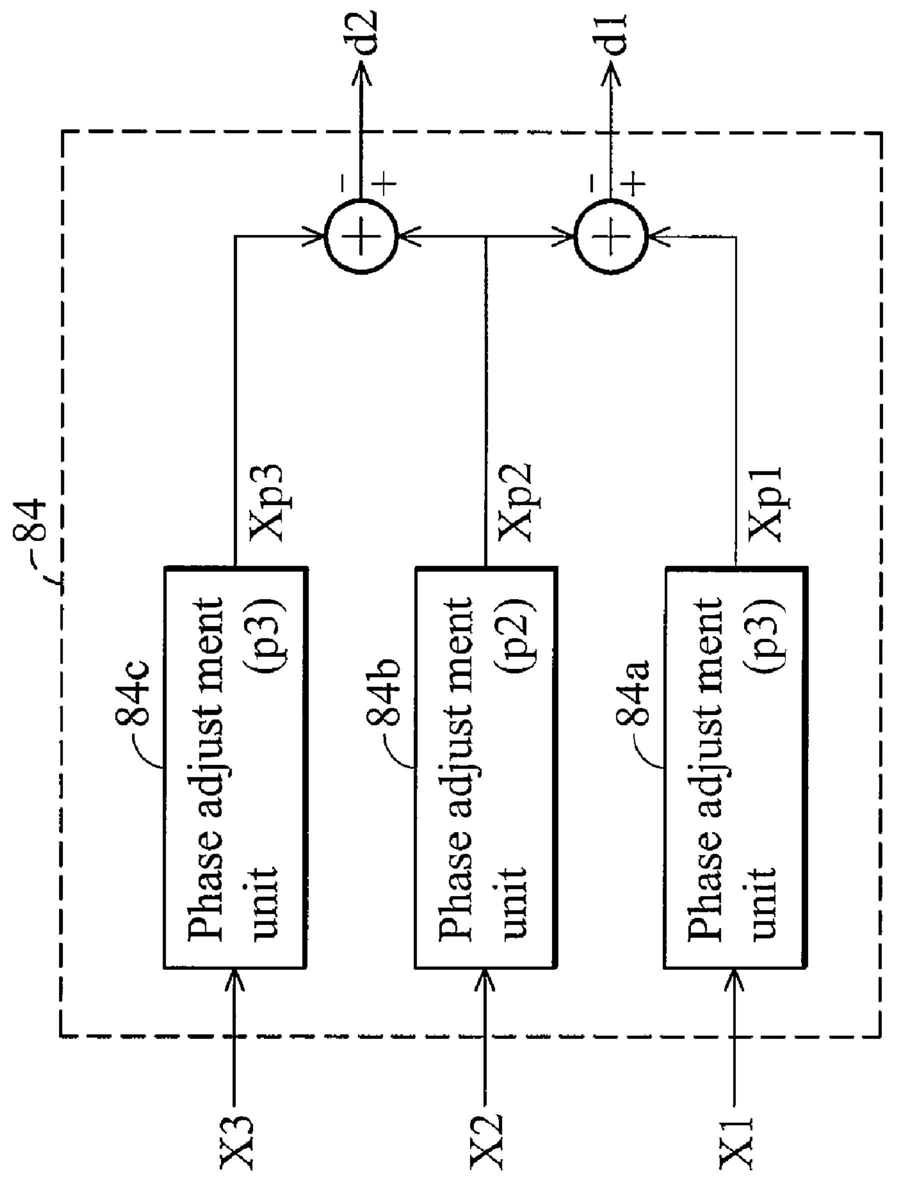
FIG. 9 shows an example of the directional microphone forming device 84 in FIG. 8.

FIG. 9 shows an example of the directional microphone forming device 84. The first, second and third electrical signals X1, X2 and X3 are respectively sent to three phase adjustment units 84*a*, 84*b* and 84*c* to perform phase shift p1 to X1, p2 to X2 and p3 to X3 to obtain three phase shifted signals Xp1, Xp2 and Xp3. The phase shifted signal Xp2 is then subtracted from the phase shifted signal Xp1 and the phase shifted signal Xp3 is subtracted from the phase shifted signal Xp2, thereby obtaining the first directional microphone signals d1 and d2. The first and second bi-directional microphone can be formed by other sophisticated devices or methods and is not limited to the described method.

The combining device 86 receives the first and second directional microphone signals d1 and d2 and outputs a combined directional microphone signal Z with a combined beam pattern for noise suppression correlated to the first and second bi-directional patterns 41 and 42. The combining device 86 carries out linear combination of the first and second directional microphone signals d1 and d2 using a first and second weight values $\alpha$ and $\beta$ such that the combined directional signal Z equals $\alpha \times d1 + \beta \times d2$. In this embodiment, for example $\alpha$ and $\beta$ are 1 to provide a combined beam pattern 50 as shown in FIG. 5 to enhance noise suppression in up and down directions.

The noise suppression device 88 receives the combined directional microphone signal d1 as a reference channel signal r1 and one or the sum of the first to third electrical signals (X1 to X3) as a main channel signal m1 to output a clear audio signal Sc with a cone beam pattern. To choose X1, X2, X3 or the sum of X1 to X3 depends on practical application. Here, the first electrical signal X is input to the noise suppression device 86 to serve as the main channel signal m1.

The noise suppression device 88 may comprise an adaptive channel decoupling device 88*a* to receive the first and second directional microphone signals (d1, d2) and one or the sum of the first to third electrical signals (here is X1) to generate the reference channel signal r1 and the main channel signal m1. The noise suppression device 88 further comprises a suppression unit 88*b* receiving and processing the main channel signal m1 and the reference channel signal r1 to estimate and suppress all the noise from the main channel signal to output the clear audio signal Sc.

Figure 10B:
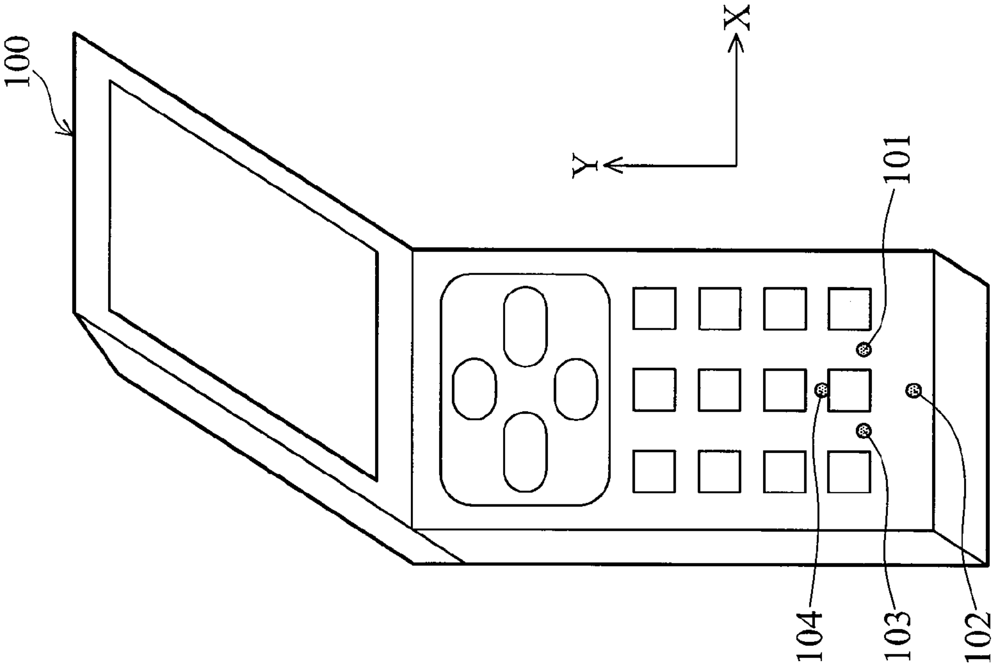
FIGS. 10A and 10B show arrangements of four omni-directional microphones of small array microphone apparatuses installed in cell phones.
Figure 10A:
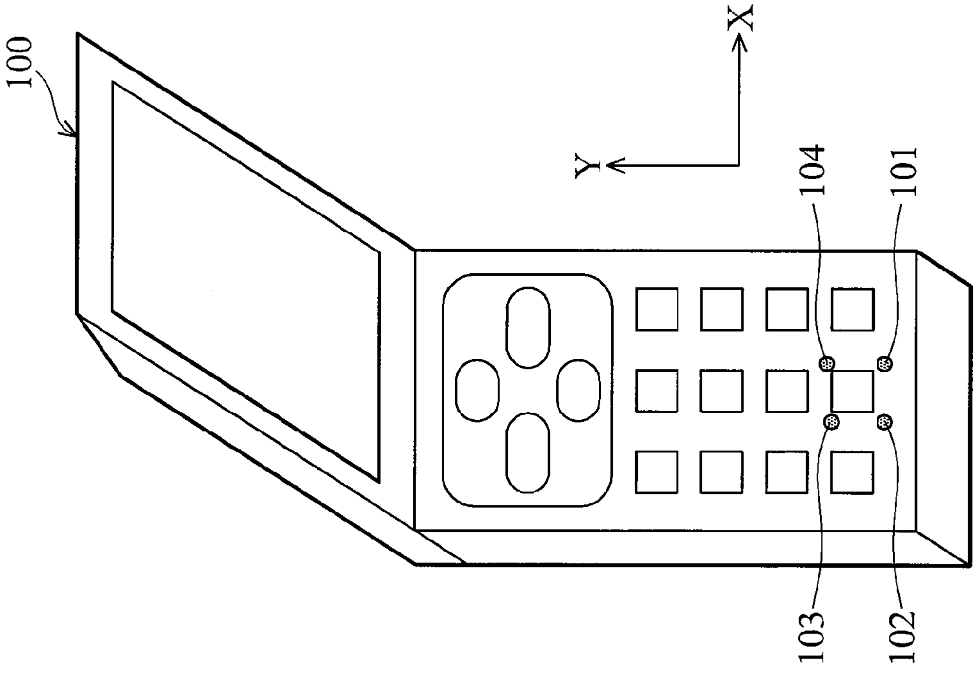
Figure 11:
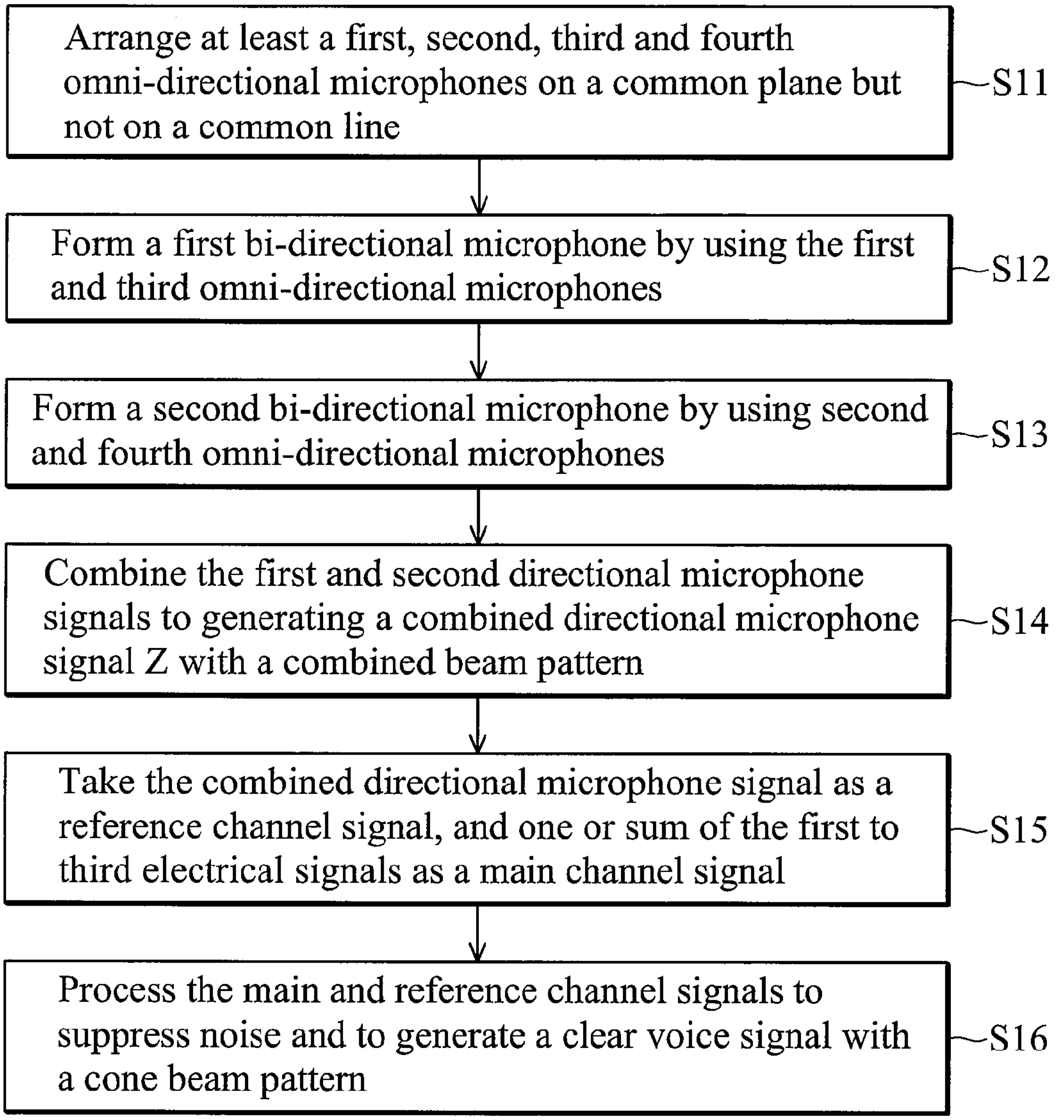
FIG. 11 is a flow chart showing another beam forming method of small array microphone apparatus according to another embodiment of the invention.

FIG. 11 is a flowchart showing a beam forming method of small array microphone apparatus according to another embodiment of the invention. First, (in step S11) at least a first, second, third and third omni-directional microphones 101, 102, 103 and 104 are arranged on a common plane but not on a common line to convert received sound into a first, second, third and fourth electrical signals. The first to fourth omni-directional microphones 101 to 104 are arranged on a surface of a cell phone 100 in a square-shape as depicted in FIG. 10A or 10B. The arrangement can be extended to any other quadrilateral shape. (in step S12) Use the first and third omni-directional microphones 101 and 103 to form a first bi-directional microphone which outputs a first directional microphone signal d1 with a first bi-directional pattern 41 as depicted in FIG. 4, or to jointly output the first directional microphone signal d1. Next, (in step S13) use the second and fourth omni-directional microphones 102 and 104 to form a second bi-directional microphone which outputs a second directional microphone signal d2 with a second bi-directional pattern 42 as depicted in FIG. 4, or to jointly output the second directional microphone signal d2. Then, (In step S14) the first and second directional microphone signals d1 and d2 are combined to generate a combined directional microphone signal Z with a combined beam pattern correlated to the first and second bi-directional patterns 41 and 42 for noise suppression. In this embodiment, the combined directional microphone signal Z is generated by linearly combining the first and second directional microphone signals d1 and d2 which are digitalized signals, using a first and second weight values $\alpha$ and $\beta$, i.e., $Z = \alpha \times d1 + \beta \times d2$. Finally, (in step S15) the combined directional microphone signal Z are taken as a reference channel signal, and one or the sum of the first to third electrical signals are taken as a main channel signal; and (in step S16) the main and reference channel signals are processed to suppress noise and to generate a clear voice signal with a cone beam pattern.

FIG. 5 shows the combined (entire) beam pattern 50 of the first and second bi-directional patterns 41 and 42 corresponding to the combined directional microphone signal Z. The proportion of $\alpha$ to $\beta$ for combining the first and second directional microphone signals d1 and d2 can be used to adjust the cancellation amount for the up and down directions. In FIG. 5, the proportion of the combination is 1, i.e., $\alpha$ and $\beta$ equal 1, $Z = d1 + d2$. Some applications, however, require more flexibility rather than a narrow beam for obtaining a clear audio signal. The proportion of $\alpha$ to $\beta$ can be adjusted to achieve this purpose.

Figure 12:
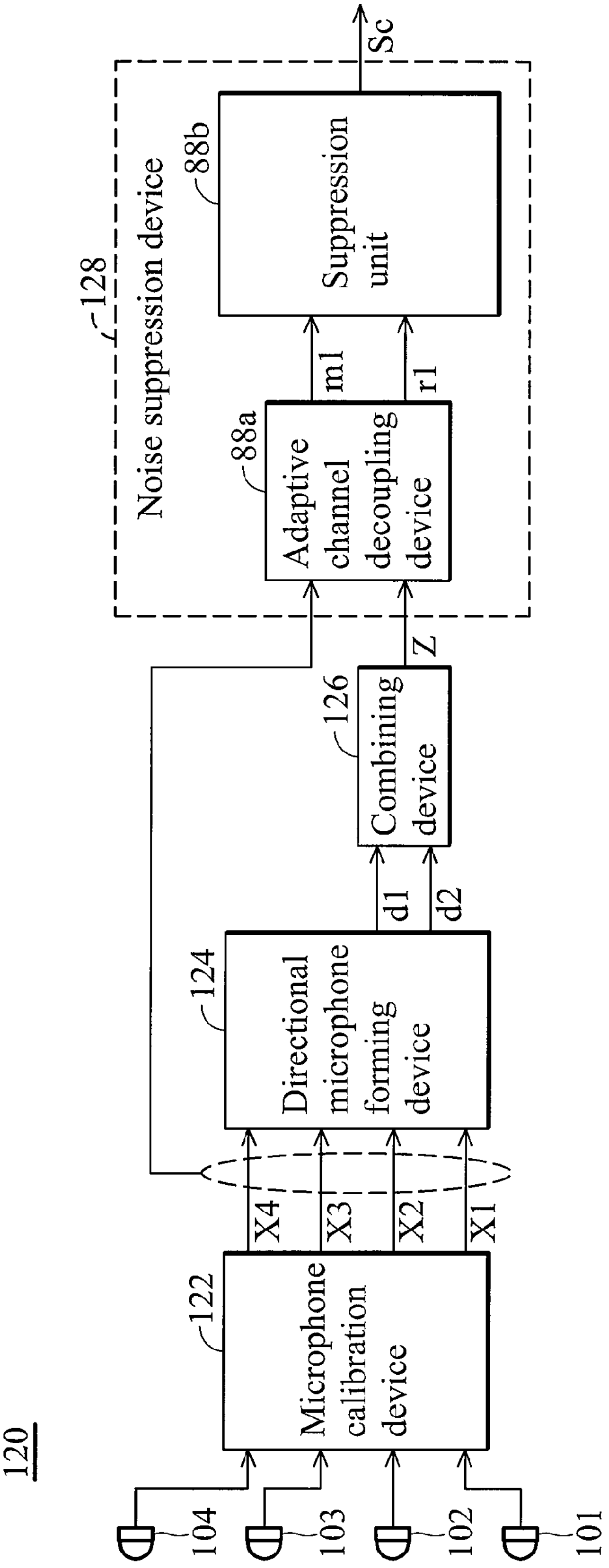
FIG. 12 shows a small array microphone apparatus according to another embodiment of the invention.

FIG. 12 shows a small array microphone apparatus 120 using the beam forming method described above. The small array microphone apparatus 120 comprises a first, second, third and fourth omni-directional microphones (101, 102 103 and 104), a microphone calibration device 122, a directional microphone forming device 124, a combining device 126 and a noise suppression device 128. In this embodiment, the small array microphone apparatus 120 is assumed to be installed in the cell phone 120 as depicted in FIG. 10A or 10B.

The first, second, third and fourth omni-directional microphones 101, 102, 103 and 104 are arranged on a common plane of the cell phone 120 but not on a common line, for receiving sound. Here, the first to fourth omni-directional microphones 101, 102, 103 and 104 are arranged in square-shape as shown in FIG. 10A or 10B.

The first, second, third and fourth omni-directional microphones 101, 102, 103 and 104 receive sound and send received sound to the microphone calibration device 122 to carry out calibration on gains and phases. Thus, the first to fourth omni-directional microphones (101 to 104) receive and convert the received sound to a first, second, third and fourth electrical signals X1, X2, X3 and X4 in conjunction with the microphone calibration device 122.

The directional microphone forming device 124 receives the first to fourth electrical signals X1, X2, X3 and X4, to the first and third omni-directional microphones 101 and 103 form a first bi-directional microphone which outputs a first directional microphone signal d1 with a first bi-directional pattern 41 (as shown in FIG. 4) and the second and fourth omni-directional microphones 102 and 104 form a second bi-directional microphone which outputs a second directional microphone signal d2 with a second bi-directional pattern 42 (as shown in FIG. 4).

Figure 13:
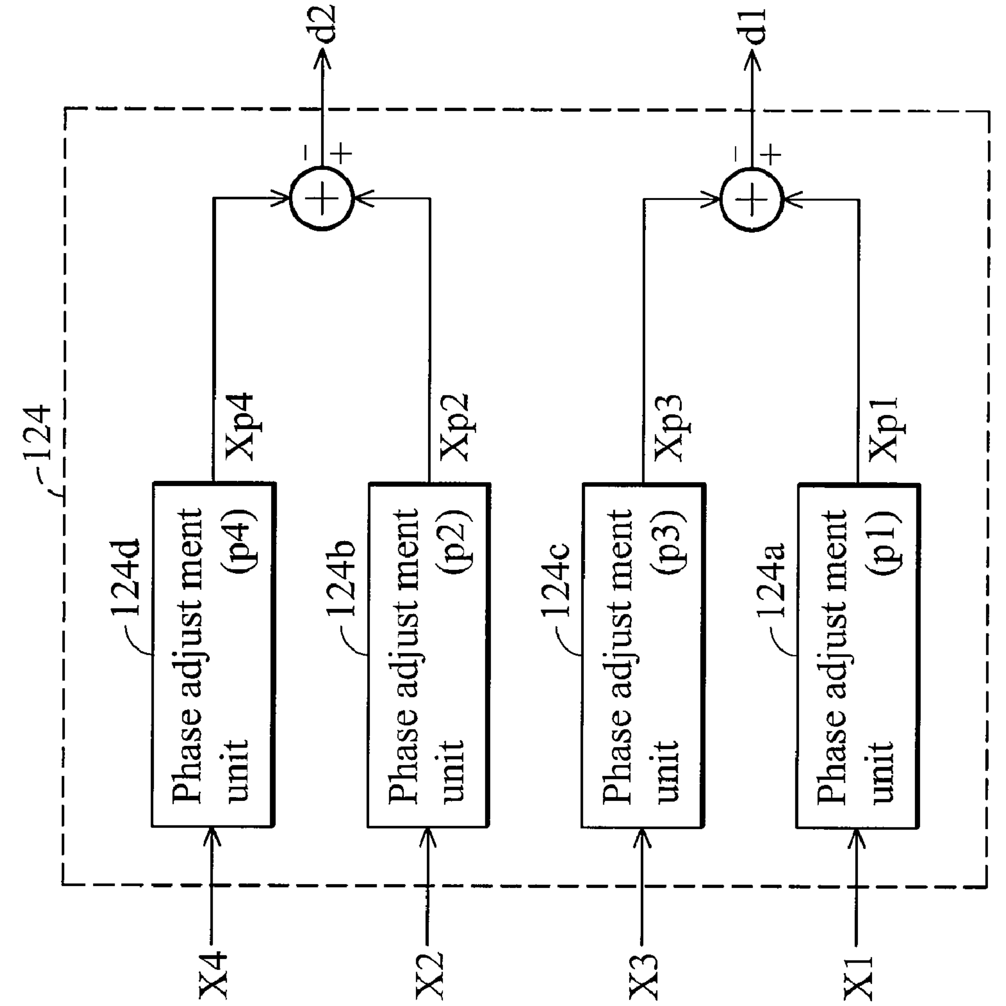
FIG. 13 shows an example of the directional microphone forming device 124 in FIG. 12.

FIG. 13 shows an example of the directional microphone forming device 124. The first, second, third and fourth electrical signals X1, X2, X3 and X4 are respectively sent to four phase adjustment units 124*a*, 124*b*, 124*c* and 124*d* to perform phase shift p1 to X1, p2 to X2, p3 to X3 and p4 to X4 to get four phase shifted signals Xp1, Xp2, Xp3 and Xp4. Then, the phase shifted signal Xp3 is subtracted from the phase shifted signal Xp1 and the phase shifted signal Xp4 is subtracted from the phase shifted signal Xp2, thereby obtaining the first directional microphone signals d1 and d2. The first and second bi-directional microphone can be formed by other sophisticated devices or methods, not limited to this.

The combining device 126 receives the first and second directional microphone signals d1 and d2 and outputs a combined directional microphone signal Z with a combined beam pattern for noise suppression correlated to the first and second bi-directional patterns 41 and 42. The combining device 126 carries out linear combination to the first and second directional microphone signals d1 and d2 using a first and second weight values α and β such that the combined directional signal Z equals $\alpha \times d1 + \beta \times d2$. In this embodiment, for example α and β are 1 to provide a combined beam pattern 50 as shown in FIG. 5 to enhance noise suppression in up and down directions.

The noise suppression device 128 receives the combined directional microphone signal d1 as a reference channel signal r1 and one or the sum of the first to fourth electrical signals (X1 to X4) as a main channel signal m1 to output a clear audio signal Sc with a cone beam pattern. To choose X1, X2, X3, X4 or the sum of X1 to X4 depends on practical application. Here, the first electrical signal X1 is input to the noise suppression device 86 to serve as the main channel signal m1.

The noise suppression device 128 may comprise an adaptive channel decoupling device 128a to receive the first and second directional microphone signals (d1, d2) and one or the sum of the first to third electrical signals (here is X1) to generate the reference channel signal r1 and the main channel signal m1. The noise further comprises an suppression unit 128b receives and processes the main channel signal m1 and the reference channel signal r1 to estimate an entire noise and suppressing the entire noise from the main channel signal to output the clear audio signal Sc.

Figure 14:
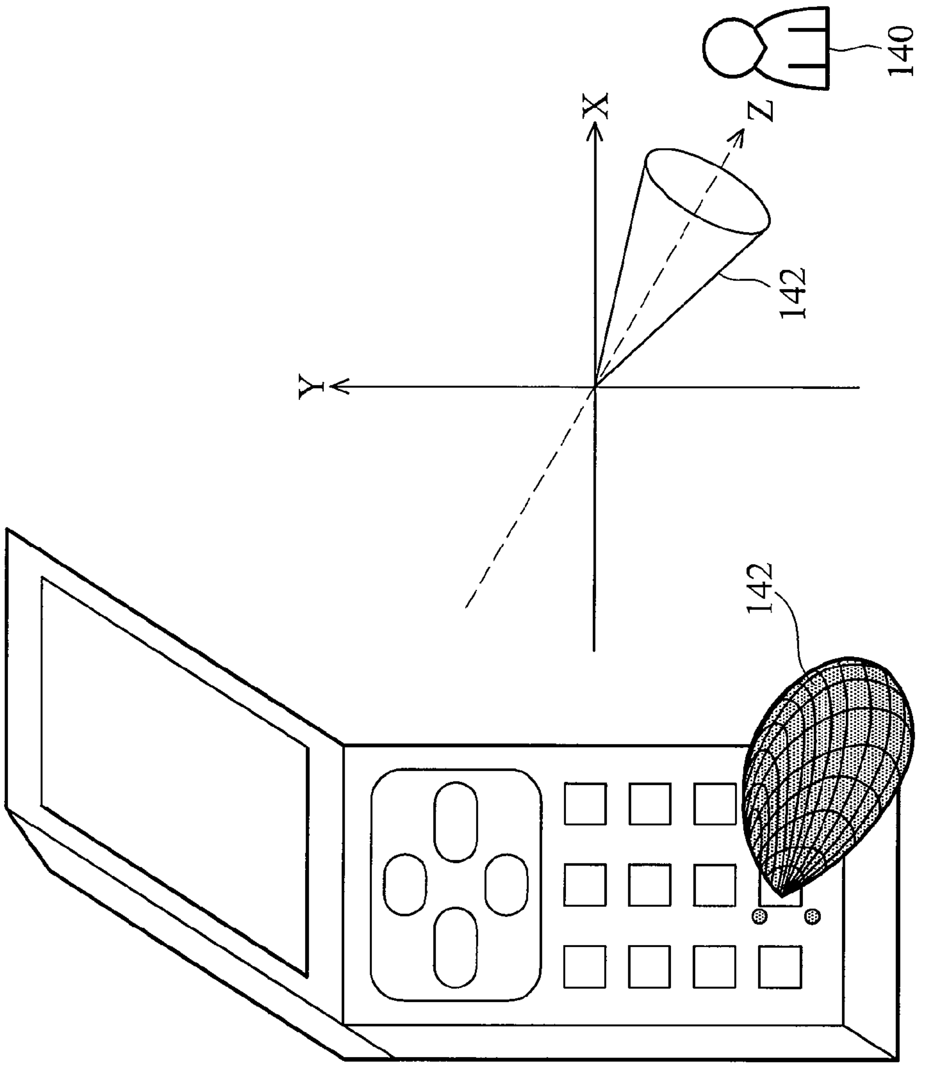
FIG. 14 shows the beam pattern formed by the small array microphone apparatus with omni-directional microphones arranged in an L-shape or a square shape.

FIG. 14 shows the beam pattern formed by the small array microphone apparatus with omni-directional microphones arranged in L-shape or square shape; wherein 140 is a near-end talker and 142 is the desired cone beam of the clear voice signal.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A small array microphone apparatus, comprising:

at least a first, second and third omni-directional microphones, arranged on a common plane but not in a line, respectively converting received sound into a first, second and third electrical signals;

a directional microphone forming device receiving the first to third electrical signals, to make the first and second omni-directional microphones jointly output a first directional microphone signal with a first bi-directional pattern and make the second and third omni-directional microphones jointly output a second directional microphone signal with a second bi-directional pattern; and a combining device receiving the first and second directional microphone signals and outputting a combined directional microphone signal with a combined beam pattern correlated to the first and second bi-directional patterns for noise suppression.

2. The small array microphone apparatus as claimed in claim 1, wherein the first to third omni-directional microphones are approximately arranged in an L-shape.

3. The small array microphone apparatus as claimed in claim 2, wherein the first bi-directional pattern comprises two lobes in a first line, the two lobes thereof respectively pointing to the left and right in the first line, and the second bi-directional pattern comprises two lobes in a second line substantially perpendicular to the first line, the two lobes thereof respectively pointing to the left and right in the second line.

4. The small array microphone apparatus as claimed in claim 1, wherein the combining device carries out linear combination to the first and second directional microphone signals using a first and second weight value.

5. The small array microphone apparatus as claimed in claim 1, further comprising a noise suppression device receiving the combined directional microphone signal as a reference channel signal and one or the sum of the first to third electrical signals as a main channel signal to output a clear voice signal with a cone beam pattern.

6. The small array microphone apparatus as claimed in claim 5, wherein the noise suppression device comprises an adaptive channel decoupling device receiving the first and second directional microphone signals and one or the sum of the first to third electrical signals to generate the reference channel signal the main channel signal.

7. The small array microphone apparatus as claimed in claim 6, wherein the noise suppression device further comprises a suppression unit receiving the main channel signal and the reference channel signal to estimate an entire noise and suppress the entire noise from the main channel signal to output the clear voice signal.

8. The small array microphone apparatus as claimed in claim 1, further comprising a fourth omni-directional microphone arranged on the common plane, wherein arrangement of the first to fourth omni-directional microphones is square-shaped.

9. The small array microphone apparatus as claimed in claim 1, wherein the first to third omni-directional microphones are approximately arranged in a triangular shape.

10. A small array microphone apparatus, comprising:

at least a first, second, third and fourth omni-directional microphones, arranged on a common plane but not in a line, respectively converting received sound into a first, second third and fourth electrical signals;

a directional microphone forming device receiving the first to fourth electrical signals, to make the first and third omni-directional microphones jointly output a first directional microphone signal with a first bi-directional pattern and make the second and fourth omni-directional microphones jointly output a second directional microphone signal with a second bi-directional pattern; and a combining device receiving the first and second directional microphone signals and outputting a combined directional microphone signal with a combined beam pattern correlated to the first and second bi-directional patterns for noise suppression.

11. The small array microphone apparatus as claimed in claim 10, wherein the first to fourth omni-directional microphones are approximately arranged in square-shape.

12. The small array microphone apparatus as claimed in claim 11, wherein the first and third omni-directional microphones are arranged in a first line, and the second and fourth omni-directional microphones are arrange in a second line substantially perpendicular to the first line.

13. The small array microphone apparatus as claimed in claim 12, wherein the first bi-directional pattern comprises two lobes in the first line, the two lobes thereof respectively pointing to the left and right in the first line, and the second bi-directional pattern comprises two lobes in the second line, the two lobes thereof respectively pointing to the left and right in the second line.

14. The small array microphone apparatus as claimed in claim 10, wherein the combining device carries out linear combination to the first and second directional microphone signals using a first and second weight value.

15. The small array microphone apparatus as claimed in claim 10, further comprising a noise suppression device receiving the combined directional microphone signal as a reference channel signal and one or the sum of the first to third electrical signals as a main channel signal to output a clear voice signal with a cone beam pattern.

16. The small array microphone apparatus as claimed in claim 15, wherein the noise suppression device comprises an adaptive channel decoupling device receiving the first and second directional microphone signals and one or the sum of the first to third electrical signals to generate the reference channel signal the main channel signal.

17. The small array microphone apparatus as claimed in claim 16, wherein the noise suppression device further comprises an suppression unit receiving the main channel signal and the reference channel signal to estimate an entire noise and suppress the entire noise from the main channel signal to output the clear voice signal.

18. The small array microphone apparatus as claimed in claim 10, wherein the first to third omni-directional microphones are approximately arranged in a quadrilateral shape.

19. A beam forming method of small array microphone apparatus, comprising:

arranging at least a first, second and third omni-directional microphones on a common plane but not on a common line to convert received sound into a first, second and third electrical signals;

making the first and second omni-directional microphones jointly output a first directional microphone signal with a first bi-directional pattern;

making the second and third omni-directional microphones jointly output a second directional microphone signal with a second bi-directional pattern; and combining the first and second directional microphone signals to generating a combined directional microphone signal with a combined beam pattern correlated to the first and second bi-directional patterns for noise suppression.

20. The beam forming method as claimed in claim 19, wherein the first to third omni-directional microphones are arranged in L-shape.

21. The beam forming method as claimed in claim 20, wherein the first bi-directional pattern comprises two lobes in a first line, the two lobes thereof respectively pointing to the left and right in the first line, and the second bi-directional pattern comprises two lobes in a second line substantially perpendicular to the first line, the two lobes thereof respectively pointing to the left and right in the second line.

22. The beam forming method as claimed in claim 19, wherein the combined directional microphone signal is generated by linearly combining the first and second directional microphone signals, using a first and second weight value.

23. The beam forming method as claimed in claim 19, further comprising the step of:

receiving the combined directional microphone signal as a reference channel signal;

receiving one or the sum of the first to third electrical signals as a main channel signal; and suppressing noise by processing the main and reference channel signals to generate a clear voice signal with a cone beam pattern.

24. The beam forming method as claimed in claim 19, further comprising the step of arranging a fourth omni-directional microphone on the common plane such that arrangement of the first to fourth omni-directional microphones is square-shaped.

25. The small array microphone apparatus as claimed in claim 19, wherein the first to third omni-directional microphones are approximately arranged in a triangular shape.

26. A beam forming method of small array microphone apparatus, comprising:

arranging at least a first, second, third and fourth omni-directional microphones on a common plane but not on a common line to convert received sound into a first, second, third and fourth electrical signals;

making the first and third omni-directional microphones jointly output a first directional microphone signal with a first bi-directional pattern;

making the second and fourth omni-directional microphones jointly output a second directional microphone signal with a second bi-directional pattern; and combining the first and second directional microphone signals to generating a combined directional microphone signal with a combined beam pattern correlated to the first and second bi-directional patterns for noise suppression.

27. The beam forming method as claimed in claim 26, wherein the first to fourth omni-directional microphones are arranged in square-shape.

28. The beam forming method as claimed in claim 27, wherein the first and third omni-directional microphones are arranged in a first line, and the second and fourth omni-directional microphones are arranged in a second line substantially perpendicular to the first line.

29. The beam forming method as claimed in claim 28, wherein the first bi-directional pattern comprises two lobes in the first line, the two lobes thereof respectively pointing to the left and right in the first line, and the second bi-directional pattern comprises two lobes in the second line, the two lobes thereof respectively pointing to the left and right in the second line.

30. The beam forming method as claimed in claim 26, wherein the combined directional microphone signal is generated by linearly combining the first and second directional microphone signals, using a first and second weight value.

31. The beam forming method as claimed in claim 26, further comprising the step of:

receiving the combined directional microphone signal as a reference channel signal;

receiving one or the sum of the first to third electrical signals as a main channel signal; and suppressing noise by processing the main and reference channel signals to generate a clear voice signal with a cone beam pattern.

32. The small array microphone apparatus as claimed in claim 26, wherein the first to third omni-directional microphones are approximately arranged in a quadrilateral shape.

* * * * *